J. F. POND.
Washing Machine.
No. { 115 / 1,219. }
Reissued Aug. 13, 1861.
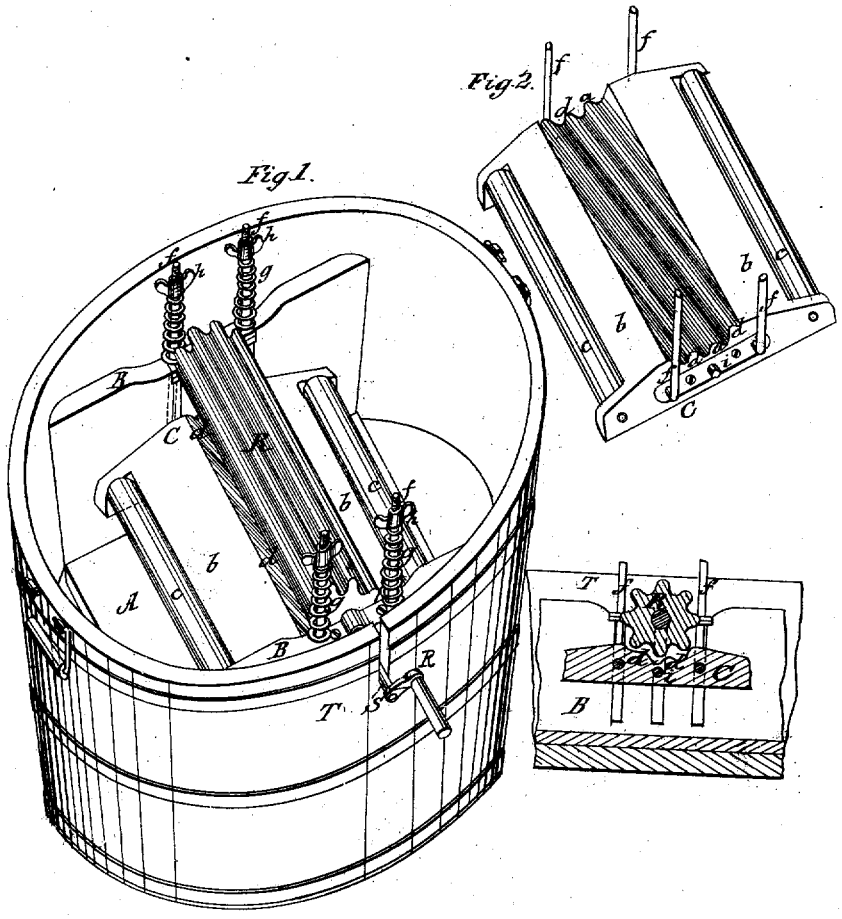
Witnesses.
Jas. B. Clary
Geo. Potter.
Inventor.
Joseph F. Pond.
N. PETERS, PHOTO-LITHOGRAPHER, WASHINGTON, D. C.

UNITED STATES PATENT OFFICE.

JOSEPH F. POND, OF CLEVELAND, OHIO.

IMPROVED WASHING-MACHINE.

Specification forming part of Letters Patent No. 28,404, dated May 22, 1860; Reissue No. 1,219, dated August 13, 1861.

*To all whom it may concern:*

Be it known that I, JOSEPH F. POND, of Cleveland, in the county of Cuyahoga and State of Ohio, have invented new and useful Improvements in Washing-Machines; and the following is a clear and exact description of the same, reference being had to the accompanying drawings, making a part of this specification, in which—

Figure 1 is a perspective view of the machine applied to a common wash-tub. Fig. 2 is a perspective view of the diagonal fluted spring-bed. Fig. 3 is an end view of fluted roller and diagonal bed.

My invention consists, first, in the adaptation to a common wash-tub of a separate frame, which supports the washing mechanism, hereinafter fully described, the top edge of the tub having a notch or opening to receive the crank-shaft, which helps to hold the mechanism in its place when being operated; second, combining with a fluted roller in fixed bearings a yielding bed and rubbing-board, grooved obliquely to the axis of the roller, so that the clothing will be subjected to a continuous rubbing pressure while passing between the roller and the bed.

To enable others skilled in the art to make and use my invention, I will describe it more fully, referring to the drawings and the letters marked thereon.

I make the frame of hard wood, of about one inch in thickness, the base A being from six to ten inches wide. The length may be varied to suit different-sized tubes. On each end is secured the upright pieces B B, which are of sufficient length to shape to the circle and fit into the tub T, so as to hold the frame firmly in its place. The height of the upright pieces B B may vary from eight to twelve inches, according to the capacity of the tub. On the center of the pieces B B are secured metal boxes *e e*, in which the journals *s s* of the fluted roller R bear, the boxes *e e* extending out each way from the center sufficient to form guides for the rods *f f f f*, which connect with the yielding bed *c* below. The yielding bed mechanism, as seen in Fig. 2, is constructed by having end pieces, D D, which are connected together by the inclined planes *b b*, having the concave or obliquely-grooved rubbing-board *d d* in the center, in the outer edges of which are pivoted rollers *c′ c′*, which assist in conveying the clothes to the action of the fluted roller R, which is operated by the crank K. To the end pieces, D, is fastened a metal plate, I, in the center of which is a steady-pin, *i*, made to fit into a perpendicular groove in the upright piece B, which keeps the concave rubbing-surface *d d* directly under the roller R, while the frame will oscillate, and yield so as to admit and conform to any quantity of clothes, more or less, by the action of coiled springs *g g g g* around the rods *f f f f*, and the pressure may be regulated by the thumb-nuts *h h h h*.

In operation the clothing is carried from side to side of the bed between the roller R and concave *d a* by turning the crank K, thereby producing a continuous rubbing during the passage by reason of the oblique corrugations of the bed.

Among the many advantages derived in the construction of my mechanism and its adaptation to the common wash-tub is that the circular form of the tub to approach and work around is far preferable to a square or longitudinal box or vat, and is much less liable to become leaky by getting dry, is much lighter, and consequently more portable and convenient, especially as the washing apparatus is taken out when not in use; also, for the internal arrangement the circular form has great advantages over the square box by using much less water, and giving an easy flow to the suds, and rinsing water under and around the clothes, as they pass through and dip in the open semicircular space on each side, there being no acute angles to obstruct any of the movements.

It is a conceded fact that the form of many good washing-machines, they being a square or longitudinal vat, has prevented their coming into more general use, they are uncouth-looking, cumbersome, too heavy when soaked to be easily handled, and always in the way. The mechanism being attached to the box, they cannot be used for other purposes. They are constantly becoming dry, and so leaky that the people have become disgusted with them, and almost universally condemn all washing-machines as a household institution.

Now, the advantages derived by my arrangement, as above described, are: It will readily be seen that, in the first place, it is very portable and light, does not become injured by drying, as it is not required to hold the water, but simply to support the mechanism, and therefore may be removed from the tub and set upon a shelf out of the way when not in use, and, in the second place, that it can be furnished at a cost within the reach of all families who usually have a wash-tub, and when applied thereto makes the most perfect machine.

Having thus fully described my invention, its operation, and advantages, what I claim as new, and desire to secure by Letters Patent, is—

1. The adaptation to a common wash-tub, T, of a separate portable-frame, which supports the washing mechanism, consisting of the upright pieces B B, the fluted-roller R, and yielding bed C, constructed, arranged, and combined in the manner and for the purposes set forth.

2. The obliquely-fluted spring-bed C, in combination with the fluted roller R, arranged and operating substantially as and for the purposes specified.

JOSEPH F. POND.

Witnesses:
J. B. WOODRUFF,
WM. FRANK BROWN.